Aug. 7, 1934. H. HUEBER 1,969,079
CONTROL ACTUATOR FOR WINDSHIELD CLEANERS
Filed June 2, 1930 2 Sheets-Sheet 1

Inventor
Henry Hueber
By Barton A. Bean Jr.
Attorney

Aug. 7, 1934.　　　　　H. HUEBER　　　　　1,969,079
CONTROL ACTUATOR FOR WINDSHIELD CLEANERS
Filed June 2, 1930　　　2 Sheets-Sheet 2

Inventor
Henry Hueber
By Barton A. Bean Jr.
Attorney

Patented Aug. 7, 1934

1,969,079

UNITED STATES PATENT OFFICE 1,969,079

CONTROL ACTUATOR FOR WINDSHIELD CLEANERS

Henry Hueber, Buffalo, N. Y., assignor to Trico Products Corporation, Buffalo, N. Y.

Application June 2, 1930, Serial No. 458,939

6 Claims. (Cl. 296—84)

This invention relates to mechanism by which the control of an exteriorly mounted windshield cleaner motor may be manipulated and regulated from the interior of the car through mechanical means.

Heretofore the windshield cleaners have been turned on and off by controls arranged on the dash or instrument panel which in the case of fluid pressure operated windshield cleaners were connected to the exteriorly mounted motors by fluid passages. With the control valve built directly on the motor housing the dash control may be done away with but it is highly desirable to operate the control from the driver's seat.

The present invention provides a simple form of control actuator readily accessible to the driver and having a mounting which will not interfere with the adjustment of the windshield and further an interlocked relation is insured between the actuator and control which will permit demounting the cleaner in an expeditious manner.

The invention will further be found to reside in the salient features of construction and the arrangements and combinations of parts hereinafter described reference being had to the accompanying drawings wherein:—

Figure 1:
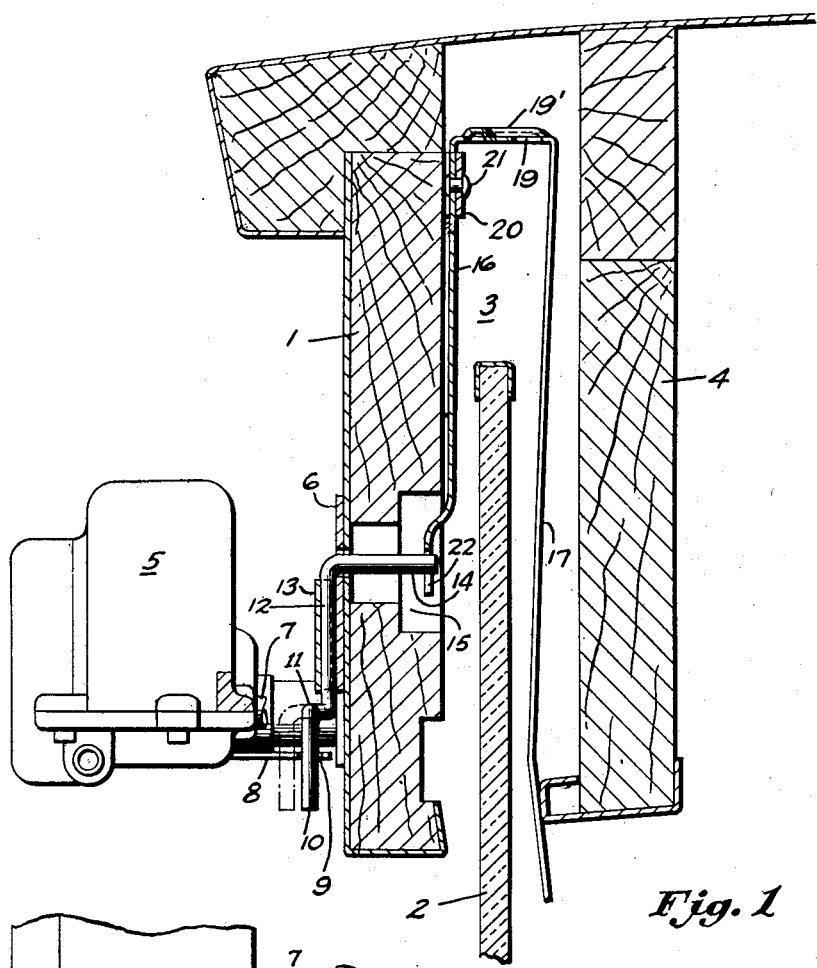
Fig. 1 is a fragmentary vertical sectional view through the windshield equipped with the present invention.

Referring more in detail to the accompanying drawings, the numeral 1 designates the front wall of the windshield header bar and 2 the glass or transparency which is vertically slidable into the pocket 3, as defined by the front wall 1 and the removable panel or rear wall 4, for purposes of ventilation.

The windshield cleaner herein depicted is of the fluid pressure type and comprises a motor 5 and an attaching or mounting plate 6 supporting the motor but spaced therefrom so as to provide an intermediate space into which the windshield cleaner shaft 7 extends. This plate is connected to the oppositely extending ears 5' of the motor by screws 5'' forming a rigid assembly which is attached to the header bar by other fasteners passed through the intermediate portion of the plate. The cleaner motor is exteriorly arranged by attaching the mounting plate 6 on the front face of the wall member 1.

The numeral 8 denotes a control which may be in the nature of the valve set forth in my copending application, Serial No. 285,246 filed June 14, 1928. This valve is provided with an opening 9 in which engages the outer end 10 of a rocker arm 11, the latter being carried by a rock shaft 12 journaled in the bearing 13 on the mounting plate 6. This rock shaft also carries a second arm 14 which is extended into the pocket 3 of the header bar through an opening 15 formed in the front wall thereof.

Mounted on the header bar is an actuator accessible from within the car and operatively connected to the valve 8. In the present showing this actuator is shown as comprising an exterior leg 16 and an interior leg 17 connected by a reach portion 19 which overlies the top edge of the glass 2 in spaced relation therewith so that the legs 16 and 17 are dependent in straddling relation with the glass. The leg 17 is slightly offset from leg 16 by extending the reach portion 19 diagonally, the latter being given longitudinal reinforcement by having a rib 19' pressed outwardly therefrom. This actuator is pivotally mounted on the header bar with the leg 17 accessible from within the car whereby the actuator may be rocked to effect movement of the control 8. The actuator is preferably mounted within the pocket 3 so as to be substantially concealed and housed therein. To this end a bracket 20 is attached to the rear face of the front wall member 1 which is substantially of inverted U-design and has its cross bar slightly offset to receive the leg 16, the latter being pivotally connected to the bracket adjacent the reach 19 as by means of a stud 21 so that the swinging of the leg 17 will impart like movement to the leg 16. The depending portions of the bracket 20 not only provide for the convenient mounting of the bracket within the pocket 3 so that the pivotal mounting 21 will be well up within the pocket, but further provide stops to prevent undue movement of the leg 16.

Preferably, the leg 16 is detachably interlocked with the arm 14 and such interlock is effected by and during placement of the windshield wiper 5 with its attaching plate 6 on the header bar. A simple form of interlocking connection is shown as consisting of a slot 22 formed in the lower end of the leg 16 to receive the free end of the rocker arm 14 when the latter is inserted through the opening 15. This provides an arrangement and construction in which the windshield cleaner motor 5, together with its connected plate 6, may be readily mounted and demounted as a unit without any special operation required for disconnecting the cleaner from the actuator.

Figure 2:
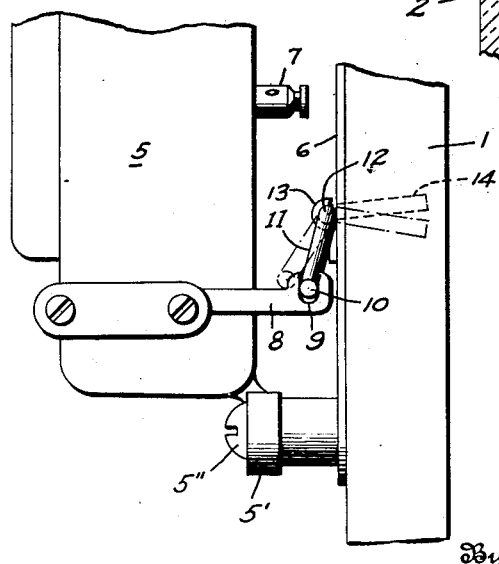
Fig. 2 is a fragmentary bottom plan view thereof.
Figure 3:
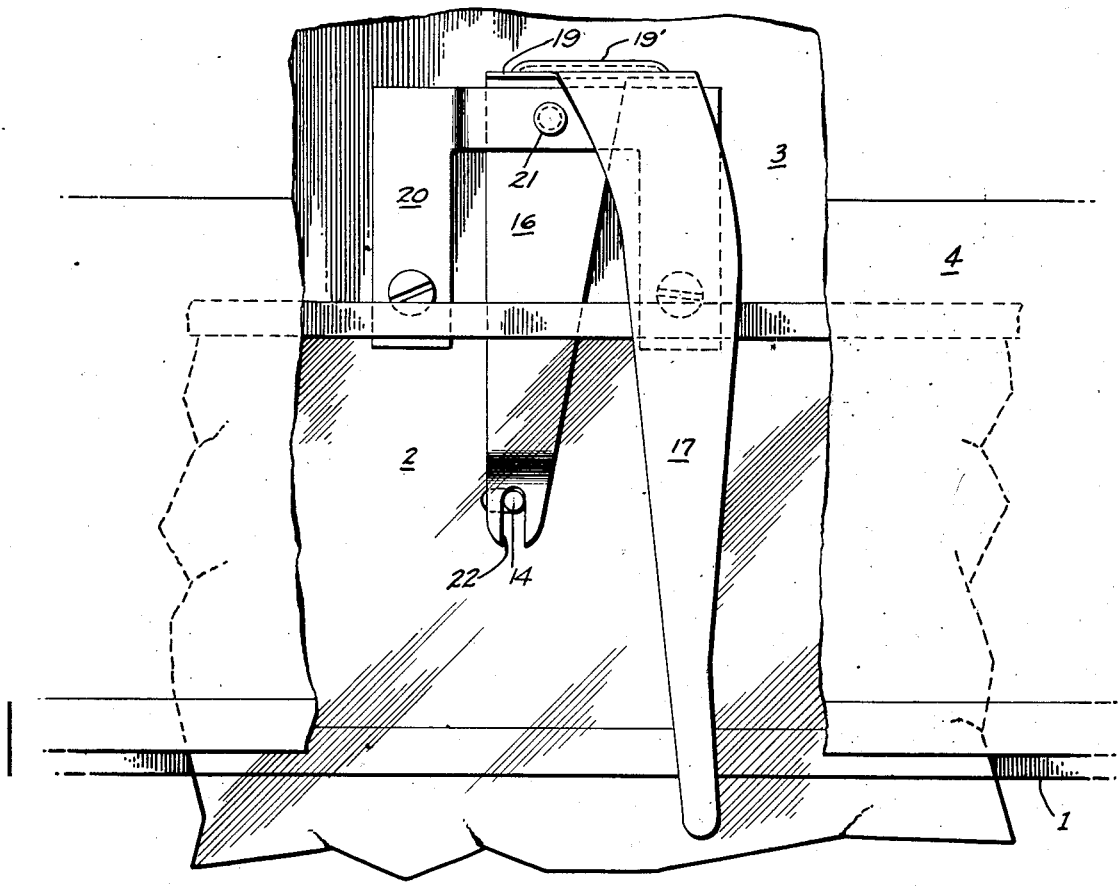
Fig. 3 is an interior elevation with portions broken away to more clearly show the actuator.
Figure 4:
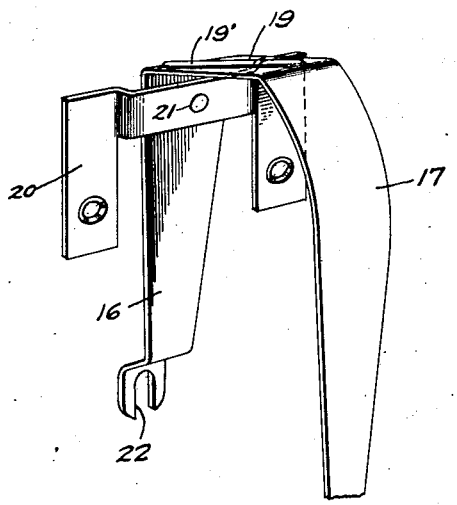
Fig. 4 is a perspective view of the actuator.

In operation the leg 17 is swung in a plane parallel to the glass 2 as by grasping the free end of the leg which is extended downwardly a short distance beneath the lower edge of the removable panel 4. This positions the actuator adjacent the field of vision so that the motorist may more readily detect the position of the same. By swinging the actuator, the leg 16 will rock the rocker member 12 and move the control 8 to open or shut the fluid pressure line of the motor 5, or interrupt the source of power should a different type of motor be employed. In the present form the control valve 8 is slidable inwardly and outwardly as the rocker arm 11 is oscillated back and forth as indicated in broken lines of Fig. 2.

What is claimed is:

1. A windshield cleaner motor having an attaching plate connected thereto in spaced relation therewith with a wiper operating shaft and a motor control member both extending into the space between the plate and the motor, a rocker member mounted on the attaching plate and having an arm connecting with the control for turning the cleaner motor off and on, and an actuator operatively connected to the rocker member, said actuator mountable in the pocket of a windshield header bar and having a rigid handle part extending over the top edge of the windshield glass.

2. In combination with a windshield having a header bar formed of a front wall and an inner wall providing a pocket into which the glass is disposed for ventilation, a bracket mounted on the front wall within the pocket, an actuator having a pair of legs straddling the glass and one leg pivoted to said bracket, said front wall having an opening therein, and a windshield cleaner motor exteriorly mounted on the front wall and having a control part projecting through the opening therein and detachably interlocked with the pivoted leg, the companion leg depending at the inner side of the glass to a point beneath the inner wall to serve as a handle.

3. In combination with a motor vehicle windshield mounting having a pocketed header bar into which the glass is disposed, of a windshield cleaner motor exteriorly mounted on the header bar and having a control part extending into the pocket, an actuator pivoted in the pocket and having a leg interlocked with said part of the front side of the glass, and a second leg depending at the inner side of the glass, said legs connected by a diagonally extending reach overlying the top edge of the glass and longitudinally reinforced.

4. In combination with a windshield and a cleaner therefor having a motor removably mounted on the exterior side thereof and carrying a movable control member, of an actuator for the control member, said actuator movably carried by the frame of the windshield and extending from the outer side of the windshield glass to the inner side thereof, a part at the inner side of the windshield for operating the actuator, and an interlocking connection between the control member and the actuator at the front side of the windshield, said connection broken and established upon respectively demounting and mounting of the motor.

5. In a windshield cleaner structure, a cleaner motor, a movable control member extending from the motor to control its operation, a rocker arm having an articulated connection to the control for actuating said control, an actuator having a lost motion connection to said rocker arm to facilitate actuation of the control member, and means for pivotally supporting said actuator.

6. In a windshield cleaner structure for a motor vehicle having a pocketed windshield glass receiving header bar, a cleaner motor mounted exteriorly of the vehicle on the header bar, a control mechanism extending from the motor and having a control portion projecting into the pocketed header bar, and actuating means mounted within the pocketed portion of the header bar and detachably engaged with said control portion, said means having a handle portion accessible from within the vehicle.

HENRY HUEBER.